(12) United States Patent
Uhlig et al.

(10) Patent No.: US 11,778,147 B1
(45) Date of Patent: Oct. 3, 2023

(54) PASSIVE SMART COLOR NIGHT VISION SCOPE SYSTEM

(71) Applicant: 7Zenze Inc, Tampa, FL (US)

(72) Inventors: Hans H. Uhlig, Dayton, NV (US); Marco Antonio Mayor, Boynton Beach, FL (US)

(73) Assignee: 7Zenze Inc, Tampa, FL (US)

( * ) Notice: Subject to any disclaimer, the term of this patent is extended or adjusted under 35 U.S.C. 154(b) by 0 days.

(21) Appl. No.: 17/942,996

(22) Filed: Sep. 12, 2022

Related U.S. Application Data (60) Provisional application No. 63/246,862, filed on Sep. 22, 2021.

(51) Int. Cl.
| | |
|---|---|
| *F41G 1/38* | (2006.01) |
| *G02B 23/12* | (2006.01) |
| *G02B 13/16* | (2006.01) |
| *H04N 7/18* | (2006.01) |
| *H04N 9/64* | (2023.01) |
| *H04N 23/55* | (2023.01) |
| *H04N 23/72* | (2023.01) |

(52) U.S. Cl.
CPC ............... *H04N 7/183* (2013.01); *F41G 1/38* (2013.01); *G02B 13/16* (2013.01); *G02B 23/12* (2013.01); *H04N 9/646* (2013.01); *H04N 23/55* (2023.01); *H04N 23/72* (2023.01)

(58) Field of Classification Search
CPC ........ H04N 7/183; H04N 9/646; H04N 23/55; H04N 23/72; F41G 1/38; F41G 1/00; F41G 11/00; G02B 13/16; G02B 23/12; F01G 3/00
See application file for complete search history.

(56) References Cited

U.S. PATENT DOCUMENTS

| | | | |
|---|---|---|---|
| 2008/0157000 A1* | 7/2008 | Shamir | H04N 5/33 250/474.1 |
| 2010/0192448 A1* | 8/2010 | Darian | F41G 11/003 42/84 |
| 2019/0353455 A1* | 11/2019 | McHale | H04N 23/55 |

* cited by examiner

*Primary Examiner* — Courtney D Thomas
(74) *Attorney, Agent, or Firm* — Smith Tempel Blaha LLC; Gregory Scott Smith (57) ABSTRACT

A Passive Smart Color Night Vision (CNV) System that includes a fully integrated scope system with dynamically controlled color night vision (CNV) algorithm to work in all light conditions. It provides the ability to replace zoom lens capability as necessary on the fly and includes interchangeable lenses. Scope parameters can be controlled from any mobile device, RF, Bluetooth, Smart goggles, Satellite, and voice. The object recognition data can be loaded to the Scope System via Bluetooth, Wi-Fi, or any form of radio communications. Recognition Algorithm using database loaded. The color night vision picture seen by the Scope System can be seen using smart glasses, mobile devices, and by remote locations. Completely passive solution—IR/Visible composite image capture. An AI Reticle Adjustment algorithm is used to calculate the line up between Reticle canter and target. Smart recording capability and alerts; and recoil dampening carrier to reduce impact on electronics and overall weapon system.

20 Claims, 7 Drawing Sheets

PASSIVE SMART COLOR NIGHT VISION SCOPE SYSTEM

CROSS REFERENCE TO RELATED APPLICATIONS

This application is related to and being filed concurrently with the United States application for patent bearing the title of PASSIVE COLOR NIGHT VISION, filed under customer number 35856 and assigned Ser. No. 17/943,035, which application is herein incorporated by reference.

BACKGROUND

When a gun is in one's hand, safety should always be at the forethought of the user. Using a firearm at night greatly impacts the threshold of care that should be applied. A key factor is ensuring that the user can accurately, consistently and clearly see the target. Because of this, the industry has spent considerable research, money and product development in scopes.

The basic function of a scope is to assist the shooter in aligning the barrel of a firearm with the target. The technical aspects of a scope can be quite complex. The inside of a rifle, shotgun or handgun scope works in much the same way as a telescope. The scope body includes a front end for receiving light energy and a back end for viewing. An objective lens is positioned in the front of the scope and allows light energy to enter into the scope body. At the back end, an ocular lens makes the sight picture visible to the shooter.

There are other internal lenses that play a role in how the scope functions, too. Typically, a focus lens is positioned behind the objective lens. As the name implies, the focus lens helps to focus objects that are viewed through the scope. Between the focus lens and the objective lens, there is an object known as an erector tube. The erector tube contains a magnification lens and the reticle assembly (the reticle is what many shooters call the "crosshairs," which are used to aim the firearm). To increase the magnification of what is being viewed, the user moves the magnification lens toward the objective lens. As the magnification is lowered, the lens moves closer to the ocular lens. Thus, if a user has a 3-9× scope, the magnification lens will be closest to the objective lens on 9× magnification and will be closest to the ocular lens on 3×.

The reticle can be mounted at the front or rear of the magnifying lenses, and this makes a difference in the image shooters see as they adjust magnification.

If the reticle is mounted at the front of the magnification lens (known as a "front (first) focal plane" scope), the reticle (crosshairs) will change size as the magnification is increased. This keeps the target and the object in the scope the same relative size, no matter what the magnification is set to. With a scope that has the reticle at the rear of the magnifying lens (known as a "rear (second) focal plane" scope), the reticle does not magnify with the object as the magnification is changed.

Lenses utilized in a scope are typically coated to reduce light reflection off the lenses. Coating the lenses operates to increase the amount of light that is allowed to enter through the optical system and into the eye, resulting in a brighter image. The internal tube that houses the lenses is sealed so that rain and moisture won't get in and fog the lenses.

The scope body is typically a metal tube that holds the lenses in place. The exterior of the scope also contains all of the necessary controls for making adjustments to the lenses to get a clear, crisp picture (like focusing a camera lens). Today, most scope tubes are made of aluminum, which is very light, durable and corrosion-resistant.

The front of the scope tube widens to accommodate the objective lens, and this flare is known as the objective bell. The rear of the scope widens to house the ocular lens, and this wider portion is known as the ocular bell.

The middle portion of the scope between the objective and ocular bells is called the main body tube. This is the portion of the scope where rings are attached to hold it to a firearm. Most main body tubes are approximately 1 inch in diameter, though some are larger (30 mm, 34 mm or more).

A night-vision device (NVD), also known as night optical/observation device (NOD) and night-vision goggles (NVG), is an optoelectronic device that allows images to be produced in levels of light approaching total darkness. The image may be a conversion to visible light of both visible light and near-infrared, while by convention detection of thermal infrared is denoted thermal imaging. The image produced is typically monochrome green, because it was considered to be the easiest color to look at for prolonged periods in the dark. NVDs are most often used by the military and law enforcement agencies, but are available to civilian users. The term usually refers to a complete unit, including an image intensifier tube, a protective and generally water-resistant housing, and some type of mounting system. Many NVDs include a protective sacrificial lens, or optical components such as telescopic lenses or mirrors. An NVD may have an IR illuminator, making it an active as opposed to passive night-vision device. They are often used in conjunction with IR laser sights which project a beam onto the target that is only visible through an NVD.

Night-vision devices were first used in World War II and came into wide use during the Vietnam War. The technology has evolved greatly since their introduction, leading to several "generations" of night-vision equipment with performance increases and price reductions. Consequently, they are available for a wide range of applications, e.g. for gunners, drivers and aviators.

Retrospectively, the US has classified NVDs into "generations". Under this periodization, the period prior to the end of World War II has sometimes been described as Generation 0.

In 1929 Hungarian physicist Kalman Tihanyi invented an infrared-sensitive electronic television camera for anti-aircraft defense in the UK. Night-vision devices were introduced in the German Army as early as 1939 and were used in World War II.

Parallel development of night-vision systems occurred in the US. The M1 and M3 infrared night-sighting devices, also known as the "sniperscope" or "snooperscope", saw limited service with the US Army in World War II and in the Korean War, to assist snipers. These were active devices, using a large infrared light source to illuminate targets. Their image-intensifier tubes used an anode and an S-1 photocathode, made primarily of silver, cesium and oxygen, and electrostatic inversion with electron acceleration was used to achieve gain.

First-generation passive devices developed in the 1960s, introduced during the Vietnam War and patented by the US Army, were an adaptation of earlier active Generation 0 technology and relied on ambient light instead of using an extra infrared light source. Using an S-20 photocathode, their image intensifiers produced a light amplification of around 1000, but they were quite bulky and required moonlight to function properly. However, night vision requires additional capabilities.

Second-generation devices developed in the 1970s, featuring an improved image-intensifier tube using a microchannel plate (MCP) with an S-25 photocathode, and resulting in a much brighter image, especially around the edges of the lens. This led to increased illumination in low ambient-light environments, such as moonless nights. Light amplification was around 20000 at this point and the technology also resulted in image resolution and reliability improvements.

Third-generation night-vision systems, developed in the late 1980s, maintained the MCP from Gen II, but used a photocathode made with gallium arsenide, which further improved image resolution. In addition, the MCP is coated with an ion barrier film for increased tube life. However, the ion barrier causes fewer electrons to pass through, diminishing the improvement expected from the gallium-arsenide photocathode. Because of the ion barrier, the "halo" effect around bright spots or light sources is larger too. The light amplification was improved to around 30000-50000 but power consumption was also increased.

The US Army Night Vision and Electronic Sensors Directorate (NVESD) is part of the governing body that dictates the names of the generations of night-vision technologies. The NVESD was originally the Army Night Vision Laboratory (NVL), which worked within the US Army Research Labs. Although the recent increased performance associated with the GEN-III OMNI-VI/VII components is impressive, as of 2021 the US Army has not yet authorized the use of the name GEN-IV for these components.

GEN-III OMNI-V-VII devices developed in the 2000s can differ from standard generation 3 in one or both of two important ways:

First of all, an automatic gated power supply system is used to regulate the photocathode voltage, allowing the NVD to instantaneously adapt to changing light conditions. Secondly, the ion barrier was removed, or in some cases made much thinner to decrease the number of electrons that are rejected by the standard GEN III MCP. This improvement resulted in less image noise and the ability to operate with a luminous sensitivity at 2850 K of only 700, compared to operating with a luminous sensitivity of at least 1800 for GEN III image intensifiers. The disadvantage associated with a thin or removed ion barrier is the overall decrease in tube life from a theoretical 20000 hours mean time to failure (MTTF) for Gen III type, to 15000 hours MTTF for GEN IV type. However, this is largely negated by the low number of image-intensifier tubes that reach 15000 hours of operation before replacement.

While the consumer market classifies this type of system as generation 4, the United States military describes these systems as generation 3 autogated tubes (GEN-III OMNI-VII). Moreover, as autogating power supplies can now be added to any previous generation of night-vision devices, "autogating" capability does not automatically class the devices as a GEN-III OMNI-VII. Any postnominals appearing after a generation type (i.e., Gen II+, Gen III+) do not change the generation type of the device, but instead indicate improvement(s) over the original specification's requirements.

With this elaborate history and migrating technology in the field of NVD, there remains a need in the art for improved performance, more advanced features, lower cost and increased reliability of NVDs.

BRIEF SUMMARY

A novel Passive Smart Color Night (PSCN) vision scope and system is described in this provisional patent. Some of the main benefits of the various embodiments of this invention, as non-limiting examples include:

Fully integrated scope system with dynamically controlled color night vision algorithm to work in all light conditions;

Provides the ability to replace zoom lens capability as necessary on the fly by allowing for interchangeable lenses;

Scope parameters can be controlled from any mobile device, such as mobile telephones, computers, laptops, smart watches, smart goggles, smart glasses, etc., utilizing any of a variety of wireless communication technologies and protocols such as RF, BLUETOOTH, WIFI, cellular data, voice, satellite, etc.;

Object recognition data can be loaded to the Scope System via Bluetooth, Wi-Fi, or any form of radio or wireless communications;

Object Recognition Algorithm using dynamically changeable and uploadable database;

The color night vision picture seen by of the scope system can be seen using smart glasses, mobile devices, and other devices either in close proximity or at a remote location;

Completely passive solution—IR/Visible composite image capture;

An AI Reticle Adjustment algorithm is used to calculate the line up between Reticle center and target;

Smart recording capability and alerts; and

Recoil dampening carrier to reduce impact on electronics and overall weapon system.

One embodiment of the present invention is a PSCN vision scope. Another embodiment of the present invention is a system to provide night vision for a scope, such as a rifle or barrel mounting scope. Such exemplary embodiments include a zoom lens, an image capture element, a memory element, a processing unit and an OLED display element. The memory element includes storage for various variables, registers, etc., as well as executable code for performing various functions. As a non-limiting example, the executable code, among other things, defines steps of a dynamic passive color night vision algorithm.

The processing unit is coupled to the image capture element for receiving digital image data input that is generated from light received through the zoom lens. The processing unit is also coupled to the memory element and configured to execute the dynamic passive color night vision algorithm on the digital image data input to create a processed image data.

The processed image data can then be provided to the OLED display element for presentment to the PCSN vision scope user or to a remote device.

The processing unit is configured to execute the dynamic passive color night vision algorithm on the digital image data input to create a processed image data by first dynamically adjusting the digital image data input that represents near infra-red light to true color. Further, the processing unit shifts the digital image data input that represents near infra-red light to visible light. The processing unit then dynamically adjusts the saturation, contrast and exposure levels and applies wide dynamic range lookup tables to multiply infra-red performance between 750-1100 nm wave length. Dynamic lookup tables are applied to prevent overexposure and under-exposure. Utilizing a 2D-3D noise filter algorithm the infra-red blue channel is modified.

In some embodiments, the zoom lens is configured to be replaceable with zoom lenses of differing magnification.

In some embodiments, the image capture element can be configured as a passive IR/visible composite image capture element that detects and captures image data with ambient light without requiring the infusion of IR light or other light (i.e. passive).

In exemplary embodiments, the operation of the PSCN vision scope is provided through the use of various electronics and software. As such, some embodiments of the PSCN vision scope include a carrier for housing the electronics. In an exemplary embodiment, the carrier includes a receptor for holding a device that houses the processing unit and the memory element, such as a circuit board or a SOC, etc. Further, the carrier may include a compartment for receiving a battery element or for having a rechargeable battery unit built into it. On each end of the exemplary carrier, a silicon based padding can be attached or integrated to absorb impact and vibration that the scope may be subject to (i.e. such as during firing of the associated weapon). The silicon based padding on each end of the carrier may also include one or more apertures that operate as escape volumes to allow for expansion of the silicon based padding under pressure.

In the various embodiments that include the carrier, the PSCN vision scope may further include a tube housing that is coupled to the zoom lens on a first end of the tube housing and that is configured to receive the carrier into an interior of the tube housing.

Other elements of exemplary PSCN vision scopes may include an extension element, a display carrier; and an eyepiece. The first end of the extension element is coupled to a second end of the tube housing and a second end of the extension element is coupled to a first end of the display carrier. Further, the second end of the display carrier is coupled to a first end of the eyepiece.

In the various embodiments, other elements may include a first coupler and a second coupler. The first couple is associated with the zoom lens and the second coupler is associated with the tube housing. As such, the first coupler and the second coupler securely hold the image capture element between them and provide for the coupling of the zoom lens to the tube housing.

Furthermore, a third coupler may be utilized to couple the second end of the tube housing to the first end of the extension, and wherein the second coupler and the third coupler sandwich the carrier between them and operate as stops.

These and other embodiments, features, advantages, aspects and functions are described in greater detail in the following detailed description.

BRIEF DESCRIPTION OF THE SEVERAL VIEWS OF THE DRAWING

The numerous advantages of the present invention may be better understood by those skilled in the art by reference to the accompanying figures in which.

DETAILED DESCRIPTION OF VARIOUS EMBODIMENTS

The present invention, as well as features and aspects thereof, is directed towards providing a passive smart color night (PSCN) vision scope system. Turning to the figures where like elements are presented with similar labels, various features, aspects and elements that can be incorporated into various embodiments are presented.

Figure 1:
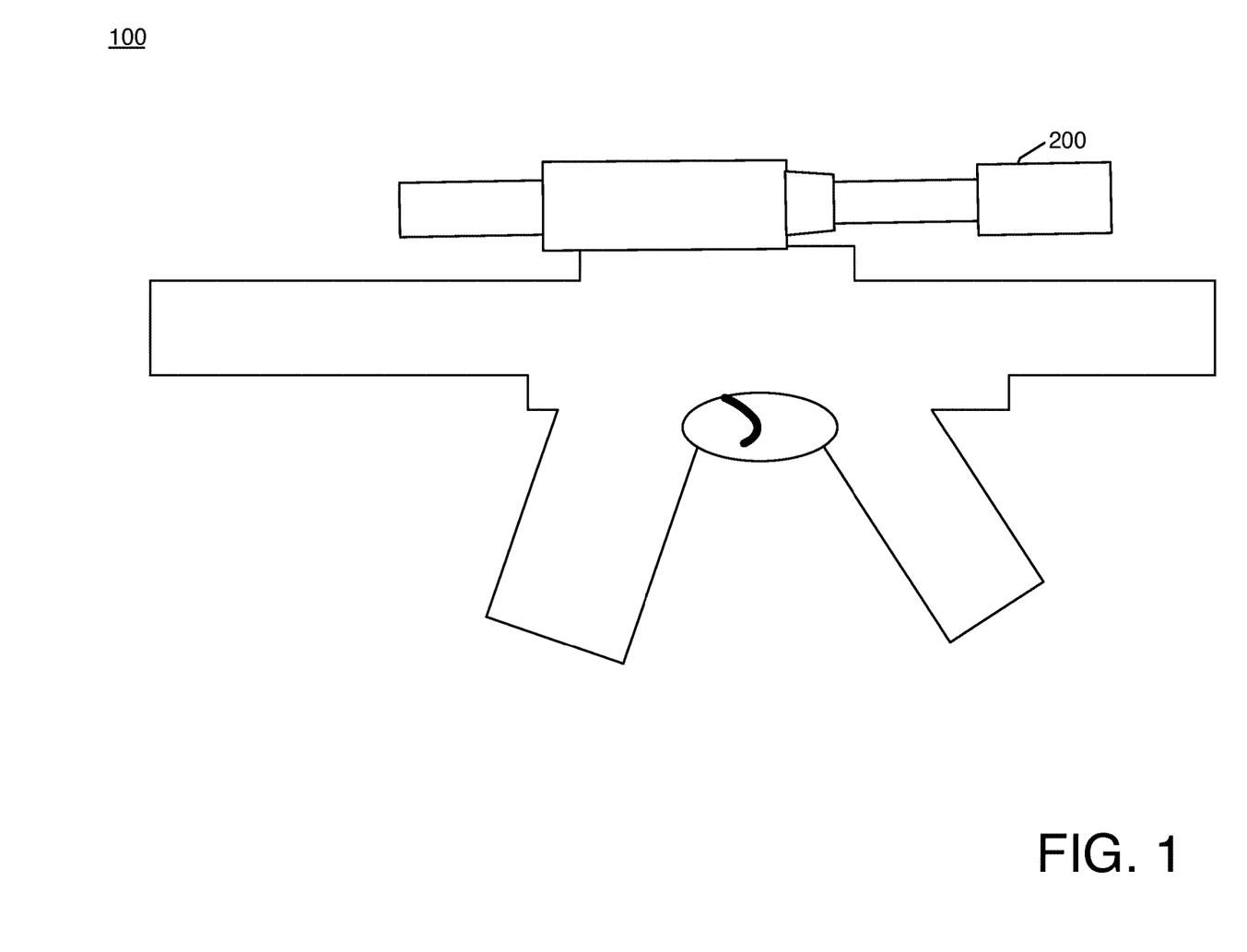
FIG. 1 is a pictorial depiction of an exemplary embodiment of a passive smart color night vision scope and system.

FIG. 1 is a pictorial depiction of an exemplary embodiment of a passive smart color night vision scope and system. The PSCN vision scope 100 is shown mounted to a firearm. The PSCN vision scope is a fully integrated system that provides capabilities not available in any other scope systems today and addresses needs in the art. In the next few sections various key features for the system and embodiments thereof are presented in greater detail. It should be appreciated that other aspects and features that are not fully described may also be incorporated into various embodiments and, other features presented in the drawings may not be described herein but they remain disclosed through the figures and as such are an integral part of this disclosure.

Fully Integrated Scope System with Revolutionary Features

Figure 2:
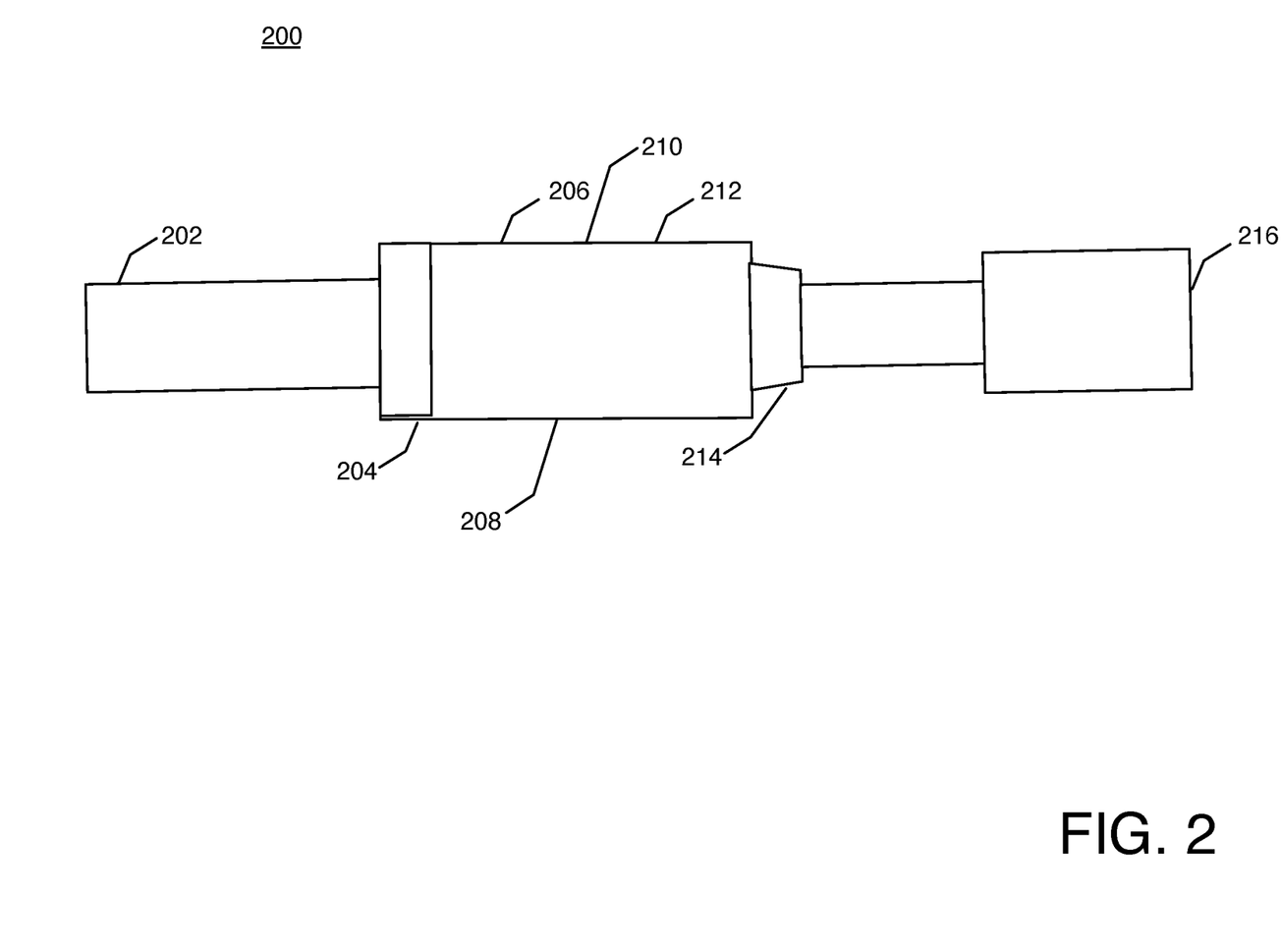
FIG. 2 is a diagram illustrating functional components and parts of a PSCN vision scope.

FIG. 2 is a diagram illustrating functional components and parts of a PSCN vision scope. The various embodiments of the PSCN vision scope provides several features and capabilities not available is present state of the art scopes. In general, the illustrated PSCN vision scope 200 includes a zoom lens 202 on the light receiving end. The zoom lens 202 can be adjusted by lengthening or shortening the lens to focus at different distances. Behind the zoom lens 202 is a passive IR/visible composite image capture element 204. In the illustration and smart glasses and mobile device interface 206 is included to enable to video captured by the PSCN vision scope 200 to be relayed to smart glasses or a mobile device for viewing. The PSCN vision scope 200 includes a processing unit to run a dynamic passive color night vision (PCNV) algorithm 208. Further, the PSCN vision scope 200 includes a reticle adjustment and overlay element 210 and a computer and image signal processor 212. A recoil dampening carrier 214 is used to help steady the PSCN vision scope 200. Finally, the user can view the target through a high definition (HD) display 216.

The various embodiments of the PSCN provide a fully integrated scope system, which in cooperation with a dynamically controlled color night vision algorithm, provide a passive night vision scope that can be utilized in all light conditions. Further, the scope parameters can be controlled from any mobile device, such as mobile telephones, computers, laptops, smart watches, smart goggles, smart glasses, etc., utilizing any of a variety of wireless communication technologies and protocols such as RF, BLUETOOTH, WIFI, cellular data, voice, satellite, etc.

Figure 3:
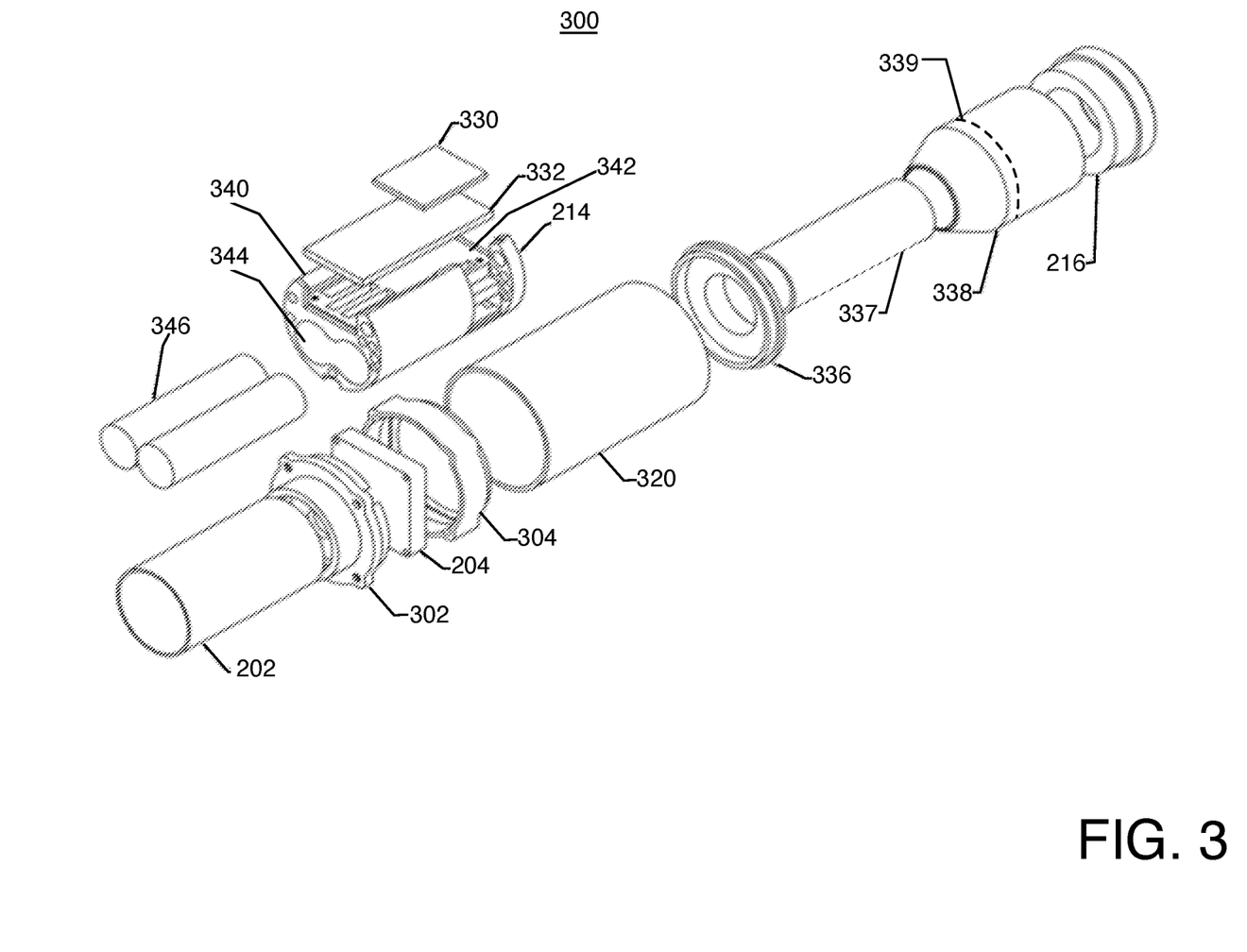
FIG. 3 illustrates the exploded view of the exemplary smart color night vision scope illustrated in FIG. 2.

FIG. 3 illustrates the exploded view of the exemplary smart color night vision scope illustrated in FIG. 2. The zoom lens 202 is coupled to passive IR/visible composite image capture element 204 (image sensor carrier) by a mounting element 302. Another coupler 304 secures the zoom lens 202 with the passive IR/visible composite image capture element 204 assembly to a tube or housing 320.

The housing 320 contains the hardware, software and components for the mobile device interface 206, processing unit to run the dynamic PCNV algorithm 208 and the reticle adjustment and overlay element 210. The components more specifically include a display driver board 330 and controller board 332. The controller board or system on a chip (SOC) 332 may include a processing unit, an interface unit and drivers for the mobile device interface 206, and an algorithm for generating and controlling the reticle adjustment and overlay element 210 on the display driver board 330. The reticle adjustment and overlay element 210 may simply be a bit mapped image that is overlaid on the other content of the display driver board 330 or it may be dynamically adjustable as the scope is adjusted, as ambient light changes occur, etc.

The illustrated embodiment is also shown as including a carrier 340 that provides a cavity 342 for mounting of the controller board 332. The carrier 340 also defines a chamber 344 for receiving a battery element 346. In the illustrated embodiment, a heat sink 336 is provided to dissipate heat from the controller board 332. The heat sink 336 may also serve to couple the housing 320 to extension 337 that operates to secure the OLED display carrier 338 and the eyepiece 216 to the scope assembly 300.

The OLED display 339, or organic light-emitting diode, also known as organic electroluminescent (organic EL) diode, is a light-emitting diode (LED) in which the emissive electroluminescent layer is a film of organic compound that emits light in response to an electric current. The OLED display 339 is shown as being mounted or located within the OLED display carrier 338. The organic layer of the OLED display is situated between two electrodes; typically, at least one of these electrodes is transparent. OLEDs are used to create digital displays in devices such as television screens, computer monitors, and portable systems such as smartphones and handheld game consoles and as such are well suited for the PSCN vision scope.

There are two main families of OLED: those based on small molecules and those employing polymers. Adding mobile ions to an OLED creates a light-emitting electrochemical cell (LEC) which has a slightly different mode of operation. An OLED display can be driven with a passive-matrix (PMOLED) or active-matrix (AMOLED) control scheme. In the PMOLED scheme, each row (and line) in the display is controlled sequentially, one by one, whereas AMOLED control uses a thin-film transistor (TFT) backplane to directly access and switch each individual pixel on or off, allowing for higher resolution and larger display sizes.

OLED is fundamentally different from LED which is based on a p-n diode structure. In LEDs doping is used to create p and n regions by changing the conductivity of the host semiconductor. OLEDs do not employ a p-n structure. Doping of OLEDs is used to increase radiative efficiency by direct modification of the quantum-mechanical optical recombination rate. Doping is additionally used to determine the wavelength of photon emission.

An OLED display works without a backlight because it emits visible light. Thus, it can display deep black levels and can be thinner and lighter than a liquid crystal display (LCD). In low ambient light conditions (such as a dark room or outside at night), an OLED screen can achieve a higher contrast ratio than an LCD, regardless of whether the LCD uses cold cathode fluorescent lamps or an LED backlight. OLED displays are made in the same way as LCDs, but after TFT (for active matrix displays), addressable grid (for passive matrix displays) or indium-tin oxide (ITO) segment (for segment displays) formation, the display is coated with hole injection, transport and blocking layers, as well with electroluminescent material after the first 2 layers, after which ITO or metal may be applied again as a cathode and later the entire stack of materials is encapsulated. The TFT layer, addressable grid or ITO segments serve as or are connected to the anode, which may be made of ITO or metal. OLEDs can be made flexible and transparent, with transparent displays being used in smartphones with optical fingerprint scanners and flexible displays being used in foldable smartphones.

As such, in the illustrated embodiment presented in FIG. 1, FIG. 2 and FIG. 3, the zoom lens 202 of the PSCN vision scope can be adjusted to focus on a target. The light that enters through the zoom lens 202 is detected at the passive IR/visible composite image capture element 204. From there, processing can be applied to the light data to create a color image to be displayed on the OLED display 339. Those skilled in the art will readily be aware that the embodiments presented herein, as well as the various aspects presented and describe is a clear leap from existing scopes in the marketplace to date.

Passive IR/Visible Image Capture

One of the features in various embodiments of the PSCN vision scope is the use of a passive IR/Visible image capture element 204. The various embodiments of the PSCN vision scope provide a completely passive solution—IR/Visible composite image capture. Passive IR/Visible image capture element utilizes several sensors that operate to capture visible light and near infrared light. These sensors typically operate in the frequency range between 400 nm and 850 nm. In various embodiments, the sensors selected to provide the passive IR/Visible image capture will not radiate any energy and thus, will not be seen or detectable with an IR receiver or detector.

More specifically, the sensors in the various embodiments operate to gather light from the environment and utilize algorithmic procedures to generate images based on the visible and IR light in the target area. Advantageously, this can be accomplished without the need to generate and transmit light energy into the target area. This is further advantageous in that the various embodiments can be utilized in a stealth mode such that the presence and operation of the scope cannot be detected by IR receivers or scanners.

Figure 4:
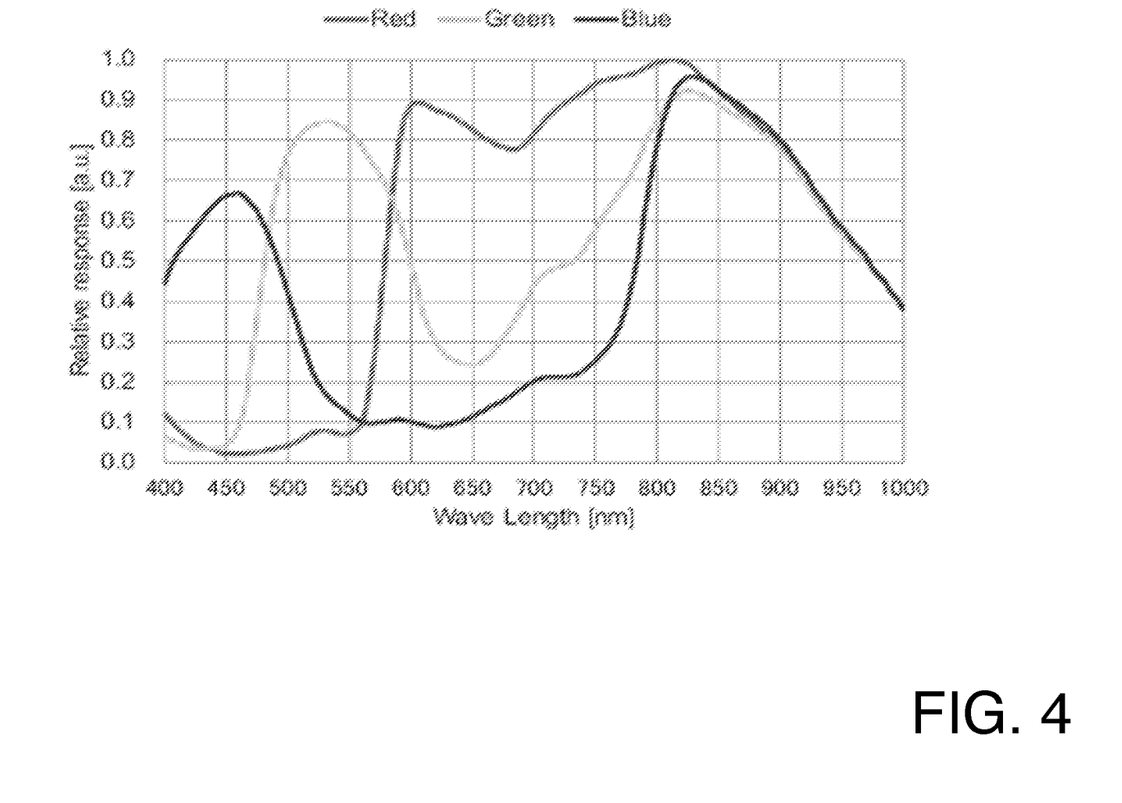
FIG. 4 is an illustration of the Passive Visible and IR Image Capture at a particular point in time.

FIG. 4 is an illustration of the Passive Visible and IR Image Capture at a particular point in time. The sensor used to generate the exemplary graph operates to capture the visible light range as well as the near infra-red (NIR) range (eg. 350 nm-1100 nm Wave Length). Capturing over this range provides excellent performance in low light environments. One available sensor that could be utilized in various embodiments is the SONY IMX 327 image sensor, as a non-limiting example.

The color night vision algorithm uses the data received from the sensor and further processes it to generate high-definition color night vision. The operation of the color night vision algorithm and how it achieves the high-definition color night vision are described in further detail in the following section.

Passive Color Night Vision Process

The data that is received from the sensor can be further processed to provide color night vision. Techniques that do not require the use of IR light to be injected into the environment are referred to as passive. The various embodiments of the scope may utilize any low-light color sensor optimized parameters. Passive color night vision can be obtained from a variety of such sensors but, it is desired to achieve the best possible result. One technology that may be employed in various embodiments is FYOTech's PCNV dynamic algorithm. The FYOTech PCNV dynamic algorithm uses the data received from the sensor and further processes it to generate high-definition color night vision. The operation of the color night vision algorithm and how it achieves the high-definition color night vision are described in further detail in the following section. Further details of the passive IR/Visible image capture algorithm can be found in the United States Patent Application bearing the title of Passive Color Night Vision Method Algorithm identified and incorporated herein-above.

The Passive Color Night Vision Method Algorithm is a novel algorithm that takes the image captured by a visible and NIR light sensor and processes the data to generate true color night vision dynamically. Herein the various embodiments of this algorithm will be referred to as the Dynamic Color Night Vision Algorithm or DCNV algorithm. The present embodiments can achieve the passive and dynamic color night vision by employing this algorithm, which in summary, the basic steps of the DCNV algorithm are:

Adjust the sensor data from NIR to true color dynamically;
Shift image data from NIR to visible;
Adjust saturation, contrast and exposure levels dynamically;
Apply wide dynamic range lookup tables to multiply IR performance between 750-1100 nm wave length;
Apply dynamic lookup tables to prevent over-exposure and under-exposure;
Apply 2D-3D noise filter algorithm mainly to the IR blue channel; and
Image Output to High Definition (HD) color display.

The DCNV algorithm can be used in many other devices and applications such as security cameras, marine displays, drones, robotics, automotive vehicles, and etc. Further details are provided in the Dynamic Color Night Vision Algorithm provisional patent.

Interchangeable Zoom Lens

It should be appreciated that the zoom lens 202 of the PSCN vision scope can be swapped out or exchanged with a zoom lens having a different level of magnification or other characteristics. As such, the PSCN vision scope magnification can be changed by selecting any of a wide variety of C-mount zoom lenses as long as the zoom lens fits in the dimensions of the PSCN vision scope. Those skilled in the art will be familiar with the mechanical design for a scope with switchable zoom lenses.

Advantageously, with the algorithmic adjustments of the PSCN vision scope, the various embodiments include the ability to replace zoom lens capability as necessary on the fly by allowing for interchangeable lenses. The system can then detect the presence of a new zoom lens and adjust the operation of the PSCN vision scope accordingly, including the adjustment of object recognition data and AI reticle adjustment as non-limiting examples.

AI Reticle Adjustment & Overlay

An AI Reticle Adjustment algorithm is used to calculate the line up between Reticle center and target. As previously described, the housing 320 contains the hardware, software and components for the mobile device interface 206, a processing unit to run the dynamic PCNV algorithm 208 and a reticle adjustment and overlay element 210. The controller board or system on a chip (SOC) 332 may include a processing unit, an interface unit and drivers for the mobile device interface 206, and an algorithm for generating and controlling the reticle adjustment and overlay element 210 on the display driver board 330. The reticle adjustment and overlay element 210 may simply be a bit mapped image that is overlaid on the other content of the display driver board 330 or it may be dynamically adjustable as the scope is adjusted, as ambient light changes occur, etc.

The PSCN vision scope can be placed into reticle calibration mode either automatically upon being turned on or by a timer/event trigger or manually by user interaction. When the PSCN vision scope is placed into reticle calibration mode, a computer-vision algorithm operates to estimate the point of impact of a ballistic after being shot from the firearm to which the PSCN vision scope is mounted.

The reticle position can be represented as the vector point (RnX, RnY). The modified reticle position Mod(RnX, RnY) equals the result of the subtraction of the original reticle position Org(Obj X, Obj Y) from the position difference calculated from position of Frame A and Frame B.

$$\text{Mod}(RnX,RnY)=\text{Org}((ObjX,ObjY)-\text{Diff}(\text{Frame}A(x,y),\text{Frame}B(x,y))$$

The algorithm compares the offset with the current reticle zero-point and adjusts (shifts) the digital reticle overlay graphic to estimate the point of impact. A G-Sensor triggers the analytics routine eliminating recoil-induced offset multiplication. The calibration process is executed within microseconds after the calibration shot is fired and can be applied to min/max range of the applicable weapon choice.

Reticle Generation and Input Option

Figure 7:
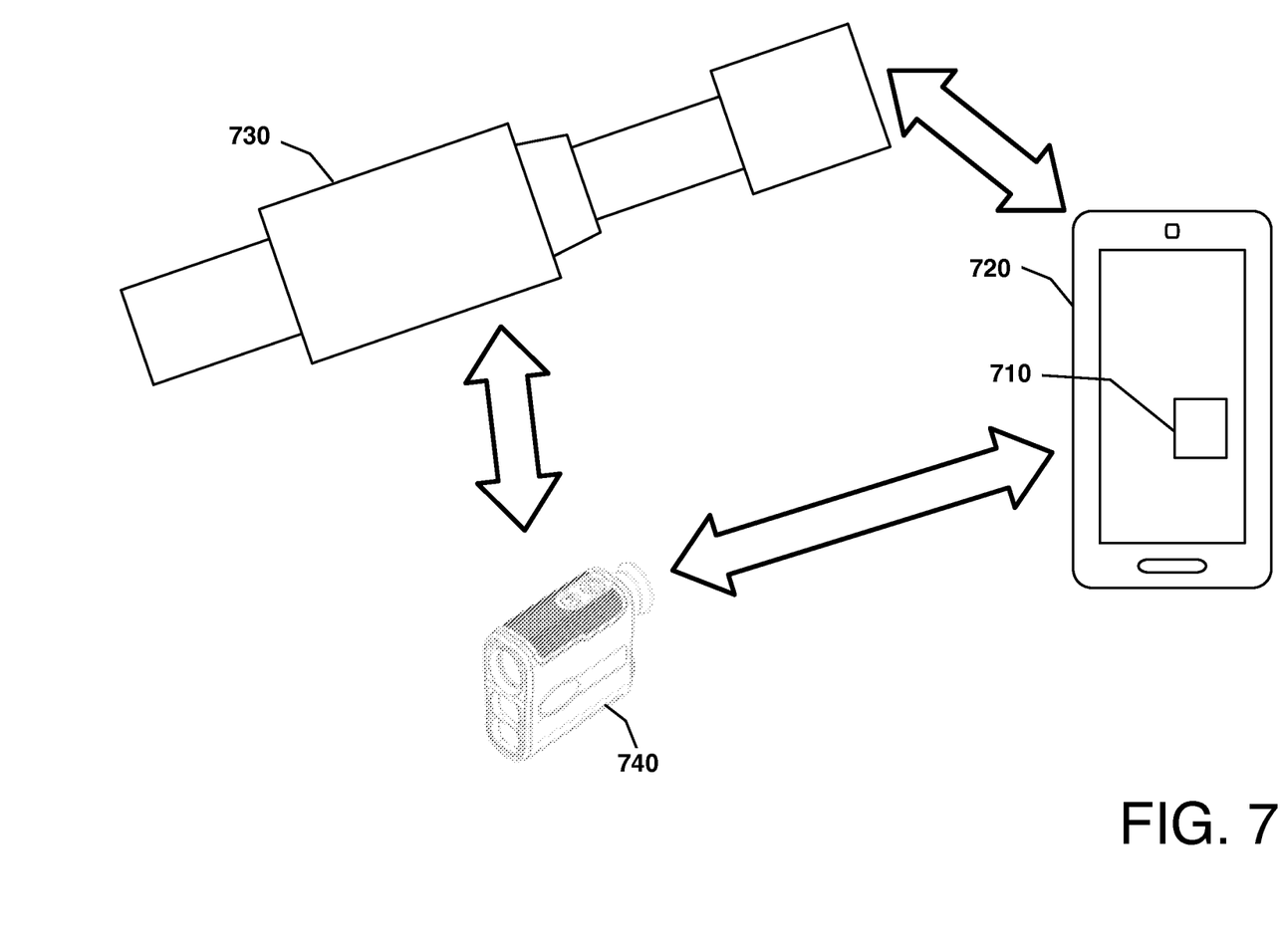
FIG. 7 is a block diagram illustrating one configuration for performing the reticle generation and input options features.

There are multiple configurations and setups for performing the reticle calibration and generation. FIG. 7 is a block diagram illustrating one configuration for performing the reticle generation and input options features. The illustrated configuration for performing reticle target calculations includes a mobile app 710 operating on a mobile device 720, such as a smart phone, computer, mobile tablet, pad, etc., a scope or optic 730 and a range finder 740. In operation, the mobile application 710 includes the ballistics and reticle algorithms that communicate via Bluetooth or Direct WiFi (or some other wireless or wired method) with the Smart [PCNV] scope 730. The reticle algorithms can be executed by a processing device 732 on the smart PCNV scope 730 or by the mobile app 710 or a combination of both. The target range, wind and other parameters can be input via the mobile app 710 from measurements using a range finder 730 and windage information.

The range finder and wind measurement device 740 with Bluetooth [BT] can communicate directly with the scope 730 and the scope processing device 332 can calculate the reticle location if the ballistic information has been pre-loaded to the scope 730 via the mobile app 710 or some other computer or device interfacing to the scope 730.

The operator can use traditional MOA calculations to perform the calculation and adjustments. A Minute of Angle (MOA) is an angular measurement. A MOA is 1/60th of a degree and 1 MOA spreads about 1" per 100 yards. (actually 1.047").

1 MOA is a different size at different distances, 8" at 800 yards is still just 1 MOA.

As a non-limiting example if the target is 300 yards from the fire arm, the MOA spreads 1" per 100 years and thus, 1 MOA at 300 years is 3". The adjustment calculations at that 300 yard target is thus made in 3" increments. As such, 2 MOA is just 2 of those 3" increments, or 6" total. And likewise, ½ MOA is ½ of those 3" increments, or 1.5".

Next, the calculation operates to determine how many 1 MOA increments will fit into the adjustment attempting to be made. For example, to adjust 8" at 400 yards, two 4" increments (or 4" chunks) will fit into the 8" of needed adjustment. Thus, to cover the adjustment 2 MOAs are required.

As another example, divide the number of inches to be adjusted by number of inches in 1 MOA at that distance. For instance, if the target is at 600 yards, to move the impact of the bullet 18", knowing that 1 MOA at 600 yards is 6", then the calculation is 18/6=3. Thus, a 3 MOA adjustment at 600 yards will move the bullet 18".

The majority of retail scopes adjust in ¼ MOA per click adjustments, some scopes adjust in ⅛, ½ or even 1 MOA per click. Once it is determined how many MOAs to adjust, the adjustments on the particular scope can be made. For example, if the scope adjusts in ¼ MOA per click, to adjust up 2 MOAs, 8 clicks total are required.

Thus, in the illustrated configuration, the range finder 740 can communicate the distance to the target and current wind conditions to app 710. The mobile app 710 can then calculate the number of MOAs to be adjusted based on a grouping in the target. The mobile app 710 can sent this information to the scope 730 where the processing unit 732 can convert the MOAs to clicks and automatically adjust the scope. Further information can be obtained by examining *Long Range Shooting Handbook*, Ryan M. Cleckner 2016 and *The Official U.S. ARMY Sniper Training & Operation Manual* ISBN-13: 978-1-9761-4268-0

PSCN Vision Scope Interfaces to any Wi-Fi/Bluetooth/RF Capable Smart Device

The features available in the PSCN vision scope can be shared to any device that has Wi-Fi or Bluetooth capabilities, or even an RF capability (such as RF interfaces in the unlicensed spectrum). A mobile application running on a smart device can be utilized to view the features available on the PSCN vision scope. As a non-limiting example, some of the features may include:

Live-stream of the viewed target from scope to mobile device;
Trigger video recording of what is being viewed;
Trigger picture recording of the current view;
Record GPS location and display on a map pertaining to the location of the PSCN vision scope and/or estimated GPS location of the viewed target; and
Recoil-triggered audio recording.

The mobile app and/or smart device may include security, such as an encryption key per device that must be entered to enable the reception of the streaming video and operation of the algorithm features available in the PSCN vision scope. Only those devices with the proper unique keys will be allowed to view or access the content. The devices must be paired with a unique key before use.

Object recognition data can be loaded into various embodiments of the PSCN vision scope via Bluetooth, Wi-Fi, or any form of radio or wireless communications. In addition, use of this object recognition data along with an object recognition algorithm using the dynamically changeable and uploadable database allows the PSCN vision scope to assist identification of targets and honing in on the target.

Smart Glasses, Mobile Viewing Device, or Remote Viewing

Figure 5:
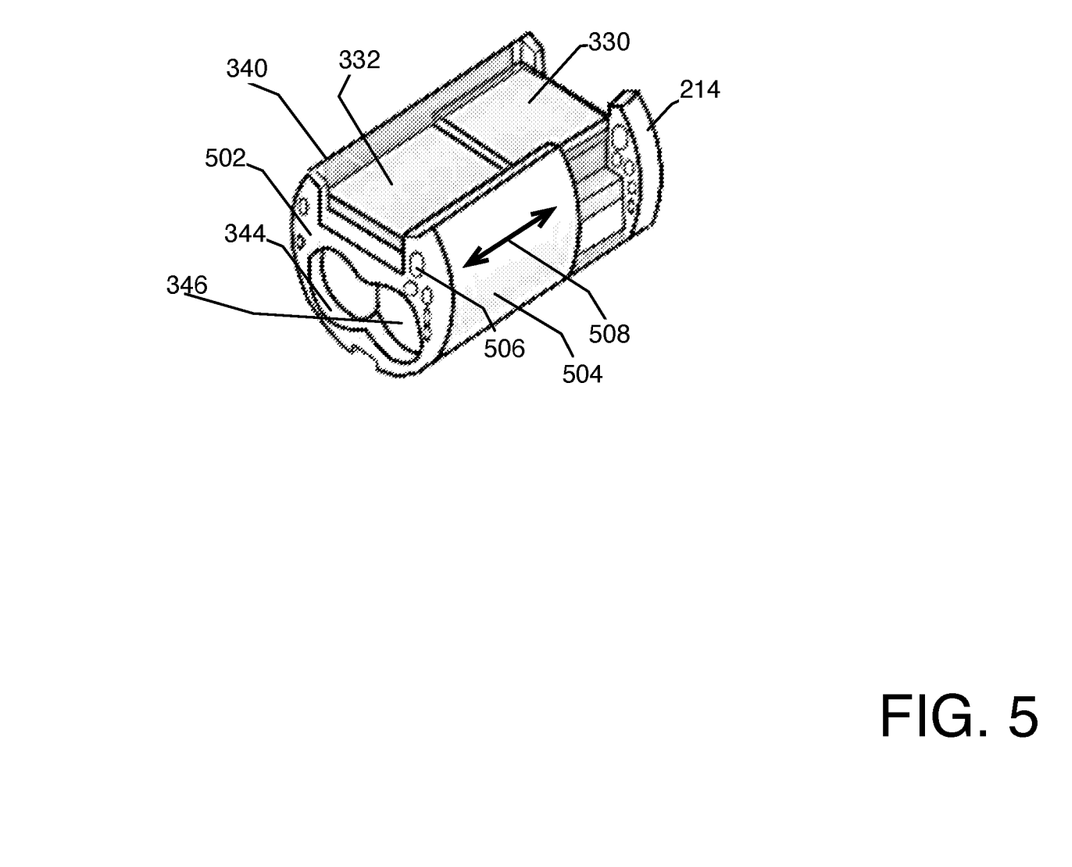
FIG. 5 illustrates the recoil dampening carrier design.

The color night vision picture seen by use of the scope system can be seen using smart glasses, mobile devices, and other devices either in close proximity or at a remote location. The passive true color night vision image that the user can see through the scope eye piece 214 can be displayed through other devices to share and send clear real-time field-of-view with team members nearby through wireless transmission. As such, the wirelessly connected team members can see the images of the PSCN vision scope via their mobile device, screens and smart glasses or goggles.

Utilizing technologies such as RF or satellite communications connectivity, the display that the user is viewing can be also viewed remotely on a monitor, laptop, mobile device, command center or in flight, such as a heads-up display.

Further, the content viewed through the PSCN vision scope can also be recorded by other devices for later viewing. In addition, smart alerts can be utilized to provide an indication to a user that a particular target has been acquired.

The passive true color night vision images can be seen in low light ambient conditions.

As a non-limiting example, a mobile device, smart phone, smart watch, laptop computer or any other properly equipped device (collectively referred to as a "mobile device") can be connected, communicatively coupled or paired with the PSCN vision scope. For instance, the mobile device may include BLUETOOTH technology that allows it to connect directly to the PSCN vision scope, or WIFI technology that allows it to connect to the same local network as the PSCN vision scope, RF technology (such as in the unlicensed frequency range typically utilized for garage door openers, etc.) that allows direct communication with the PSCN vision scope, or other technologies including, but not limited to, cellular technology, cellular data technology, Internet of Things technology (IOT), infrared technology, sonic technology, wired technology, etc. As such, the PSCN vision scope and the mobile device must include the proper hardware, software, drivers and protocol to facilitate establishment and maintenance of a communication channel and to reliably transmit data or information across the established channel. Regardless of the technology employed, once the mobile device is communicatively coupled to the PSCN vision scope, the mobile device can be utilized to control or configure the PSCN vision scope, as well as to receive status and video content from the PSCN vision scope.

For instance, the mobile device may include an app that allows a user to enter or modify parameters to control the scope. Such interface may include the ability to force the PSCN vision scope re-execute the AI Reticle Adjustment algorithm to calculate the line up between reticle center and target. Further, the app maybe used to tweak or adjust the color adjustments applied to the image data, increase or decrease the brightness, request a snapshot of the current display contents, receive and view a live stream of the displayed imagery.

Electronic Recoil Dampening Carrier to Reduce Impact on Electronics

The various embodiments provide a recoil dampening carrier to reduce impact on electronics and the overall weapon system. FIG. 5 illustrates the recoil dampening carrier design. As previously described, the housing 320 contains the hardware, software and components for the mobile device interface 206, processing unit to run the dynamic PCNV algorithm 208 and the reticle adjustment and overlay element 210. While the carrier 340 provides a cavity 342 for mounting of the controller board 332 and display driver 330 and defines a chamber 344 for receiving a battery element 346, the carrier 340 is also designed to uniquely provide recoil dampening to reduce the impact of the recoil on the electronics of the PSCN vision scope. For instance, the chamber 344 receives the battery element 346, which the mass of the batter element 346 operates as a dampening mass. The main body 504 of the carrier 340 can be constructed out of a light and non-brittle material, such as nylon while the end elements 502 and 214 can be constructed out of a more malleable material such as compressible silicon. Multiple apertures 506 in the end elements 502 and 214 may be present to provide escape volume for compressed material.

The combined mass of the main carrier body 340, the batteries 346 and the electronic components 330, 332 serve as dampening mass when an acceleration along the z-axis occurs 508 during a recoil. Under the acceleration force, the main carrier body 340 is forced along the x-axis 508 inside the housing tube 320, which is capped at both ends. The compressible silicon on the opposing ends of the carrier body 340 (end elements 502 and 214) are compressed against the appropriate end cap (depending on the direction of the force) of the housing tube 320 and as such, acts as impact absorber. As the end element 502 or 214 compresses, the apertures or escape volumes 506 allow for expansion of the end element 502 or 214, and thus dampening the accelerated movement along the z-axis. As such, the carrier 340 operates to absorb and dampen vibration of the electronics within the PSCN vision scope.

Figure 6:
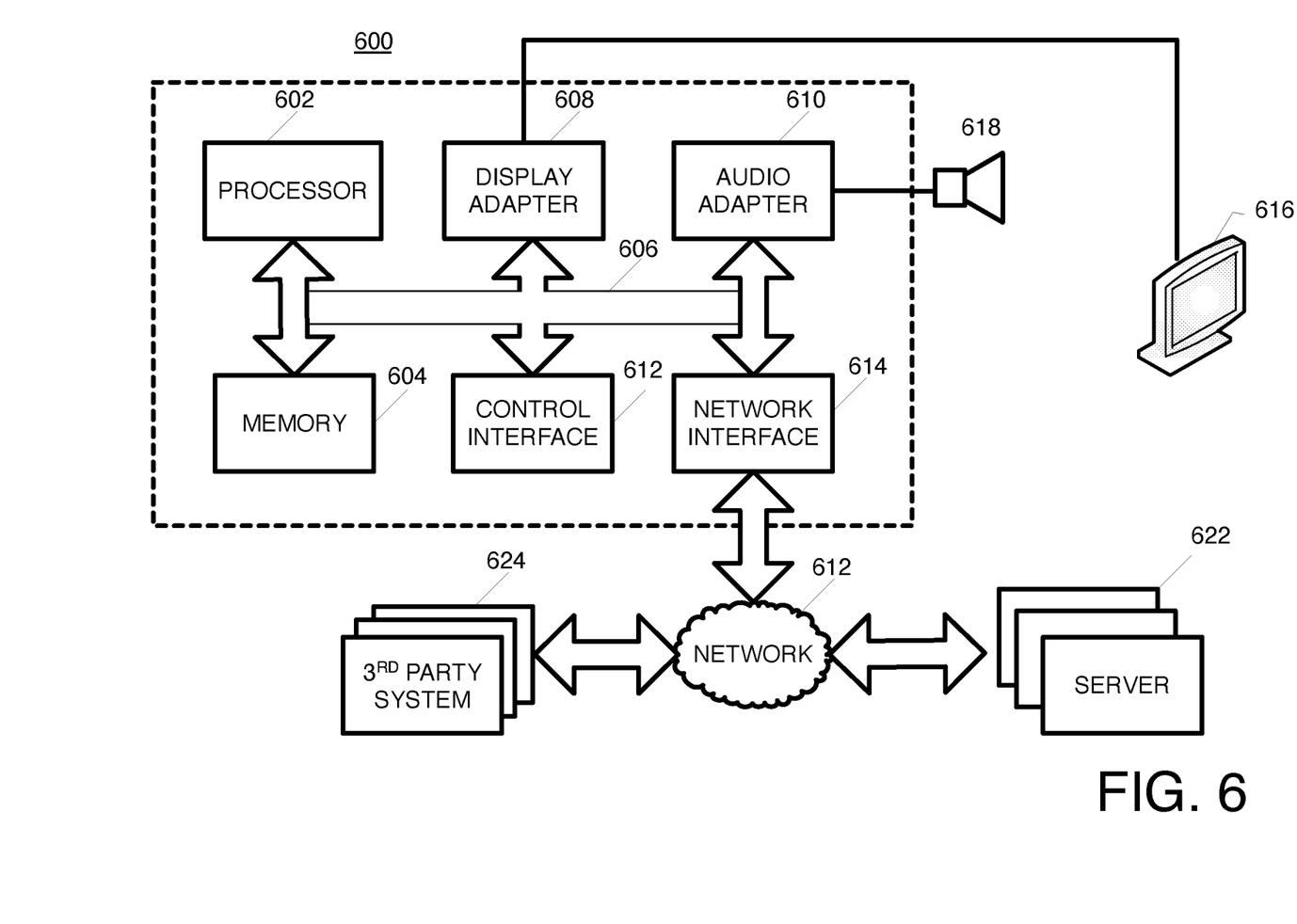
FIG. 6 is a functional block diagram of the components of an exemplary embodiment of system or sub-system operating as a controller or processor 600 that could be used in various embodiments of the disclosure for controlling aspects of the various embodiments.

FIG. 6 is a functional block diagram of the components of an exemplary embodiment of system or sub-system operating as a controller or processor 600 that could be used in various embodiments of the disclosure for controlling aspects of the various embodiments. It will be appreciated that not all of the components illustrated in FIG. 6 are required in all embodiments of the activity monitor but, each of the components are presented and described in conjunction with FIG. 6 to provide a complete and overall understanding of the components. The controller can include a general computing platform 600 illustrated as including a processor/memory device 602/604 that may be integrated with each other or, communicatively connected over a bus or similar interface 606. The processor 602 can be a variety of processor types including microprocessors, micro-controllers, programmable arrays, custom IC's etc. and may also include single or multiple processors with or without accelerators or the like. The memory element of 604 may include a variety of structures, including but not limited to RAM, ROM, magnetic media, optical media, bubble memory, FLASH memory, EPROM, EEPROM, etc. The processor 602, or other components in the controller may also provide components such as a real-time clock, analog to digital convertors, digital to analog convertors, etc. The processor 602 also interfaces to a variety of elements including a control interface 612, a display adapter 608, an audio adapter 610, and network/device interface 614. The control interface 612 provides an interface to external controls, such as sensors, actuators, drawing heads, nozzles, cartridges, pressure actuators, leading mechanism, drums, step motors, a keyboard, a mouse, a pin pad, an audio activated device, as well as a variety of the many other available input and output devices or, another computer or processing device or the like. The display adapter 608 can be used to drive a variety of alert elements 616, such as display devices including an LED display, LCD display, one or more LEDs or other display devices. The audio adapter 610 interfaces to and drives another alert element 618, such as a speaker or speaker system, buzzer, bell, etc. The network/interface 614 may interface to a network 620 which may be any type of network including, but not limited to the Internet, a global network, a wide area network, a local area network, a wired network, a wireless network or any other network type including hybrids. Through the network 620, or even directly, the controller 600 can interface to other devices or computing platforms such as one or more servers 622 and/or third party systems 624. A battery or power source provides power for the controller 600. In the description and claims of the present application, each of the verbs, "comprise", "include" and "have", and conjugates thereof, are used to indicate that the object or objects of the verb are not necessarily a complete listing of members, components, elements, or parts of the subject or subjects of the verb.

The present invention has been described using detailed descriptions of embodiments thereof that are provided by way of example and are not intended to limit the scope of the invention. The described embodiments comprise different features, not all of which are required in all embodiments of the invention. Some embodiments of the present invention utilize only some of the features or possible combinations of the features. Variations of embodiments of the present invention that are described and embodiments of the present invention comprising different combinations of features noted in the described embodiments will occur to persons of the art.

It will be appreciated by persons skilled in the art that the present invention is not limited by what has been particularly shown and described herein above. Rather the scope of the invention is defined by the claims that follow.

What is claimed is:

1. A night vision scope comprising:
   a zoom lens;
   an image capture element;
   a memory element, the memory element including executable code defining steps of a dynamic passive color night vision algorithm;
   a processing unit coupled to the image capture element for receiving digital image data input and coupled to the memory element and configured to execute the dynamic passive color night vision algorithm on the digital image data input to create a processed image data, wherein the dynamic passive color night vision algorithm is configured to adjust RGB values over a darkest to lightest range in the particular R, G, or B channel and the result of each channel is multiplied by a dynamically created luma matrix; and
   an OLED display element communicatively coupled to the processing unit and configured to receive and display the processed image data.

2. The night vision scope of claim 1, wherein the processing unit is configured to execute the dynamic passive color night vision algorithm on the digital image data input to create a processed image data by:
   dynamically adjusting the digital image data input that represents near infra-red light to true color;
   shifting the digital image data input that represents near infra-red light to visible light;
   dynamically adjusting the saturation, contrast and exposure levels;
   applying wide dynamic range lookup tables to multiply infra-red performance between 750-1100 nm wave length; and
   applying dynamic lookup tables to prevent over-exposure and under-exposure; and
   utilizing a 2D-3D noise filter algorithm to the infra-red blue channel.

3. The night vision scope of claim 1, wherein the zoom lens is configured to be replaceable with zoom lenses of differing magnification.

4. The night vision scope of claim 3, wherein the image capture element is a passive IR/visible composite image capture element that does not require the use of an IR transmitter to infuse IR light.

5. The night vision scope of claim 4, further comprising a carrier, the carrier comprising:
- a receptor for holding a device that houses the processing unit and the memory element;
- a compartment for receiving a battery element; and
- a silicon based padding on each end of the carrier to absorb impact and vibration.

6. The night vision scope of claim 5, further comprising a tube housing that is coupled to the zoom lens on a first end of the tube housing and that is configured to receive the carrier into an interior of the tube housing.

7. The night vision scope of claim 6, further comprising:
- a scope mount that is coupled to the night vision scope and is configured to be attached to any barrel mount;
- an extension element;
- a display carrier; and
- an eyepiece, wherein a first end of the extension element is coupled to a second end of the tube housing and a second endo of the extension element is coupled to a first end of the display carrier, and wherein a second end of the display carrier is coupled to a first end of the eyepiece.

8. The night vision scope of claim 7, further comprising a first coupler and a second coupler, wherein the first couple is associated with the zoom lens and the second couple is associated with the tube housing, and wherein the first coupler and the second couple securely hold the image capture element between them and provide for the coupling of the zoom lens to the tube housing.

9. The night vision scope of claim 8, wherein a third coupler configured to couple the second end of the tube housing to the first end of the extension, and wherein the second coupler and the third coupler sandwich the carrier between them and operate as stops.

10. The night vision scope of claim 9, wherein the silicon based padding on each end of the carrier includes one or more apertures that operate as escape volumes to allow for expansion of the silicon based padding under pressure.

11. A system to provide night vision for a scope comprising:
- a barrel mount that is configured to be secured to a barrel of a firearm;
- a scope mount that is coupled to a scope and is configured to be attached to the barrel mount;
- the scope comprising:
  - a zoom lens;
  - an image capture element;
  - a memory element, the memory element including executable code defining steps of a dynamic passive color night vision algorithm;
  - a processing unit coupled to the image capture element for receiving digital image data input and coupled to the memory element and configured to execute the dynamic passive color night vision algorithm on the digital image data input to create a processed image data wherein the dynamic passive color night vision algorithm is configured to adjust RGB values based darkest to lightest range in the particular R, G, or B channel and the result of each channel is multiplied by a dynamically created luma matrix; and
  - an OLED display element communicatively coupled to the processing unit and configured to receive and display the processed image data.

12. The system of claim 11, wherein the scope further comprises:
- a processing unit configured to execute the dynamic passive color night vision algorithm on the digital image data input to create a processed image data by:
- dynamically adjusting the digital image data input that represents near infra-red light to true color;
- shifting the digital image data input that represents near infra-red light to visible light;
- dynamically adjusting the saturation, contrast and exposure levels;
- applying wide dynamic range lookup tables to multiply infra-red performance between 750-1100 nm wave length;
- applying dynamic lookup tables to prevent over-exposure and under-exposure; and
- utilizing a 2D-3D noise filter algorithm to the infra-red blue channel.

13. The system of claim 11, wherein the zoom lens is configured to be replaceable with zoom lenses of differing magnification.

14. The system of claim 13, wherein the image capture element is a passive IR/visible composite image capture element.

15. The system of claim 14, wherein the scope further comprises a carrier, the carrier comprising:
- a receptor for holding a device that houses the processing unit and the memory element;
- a compartment for receiving a battery element; and
- a silicon based padding on each end of the carrier to absorb impact and vibration.

16. The system of claim 15, wherein the scope further comprises a tube housing that is coupled to the zoom lens on a first end of the tube housing and that is configured to receive the carrier into an interior of the tube housing.

17. The system of claim 16, wherein the scope further comprises:
- an extension element;
- a display carrier; and
- an eyepiece, wherein a first end of the extension element is coupled to a second end of the tube housing and a second endo of the extension element is coupled to a first end of the display carrier, and wherein a second end of the display carrier is coupled to a first end of the eyepiece.

18. The system of claim 17, wherein the scope further comprises a first coupler and a second coupler, wherein the first couple is associated with the zoom lens and the second couple is associated with the tube housing, and wherein the first coupler and the second couple securely hold the image capture element between them and provide for the coupling of the zoom lens to the tube housing.

19. The system of claim 18, wherein the scope further comprises a third coupler configured to couple the second end of the tube housing to the first end of the extension, and wherein the second coupler and the third coupler sandwich the carrier between them and operate as stops.

20. The system of claim 19, wherein the silicon based padding on each end of the carrier includes one or more apertures that operate as escape volumes to allow for expansion of the silicon based padding under pressure.

* * * * *